J. KESSLER.
HORSESHOE CALK.
APPLICATION FILED MAY 31, 1916.

1,206,332.

Patented Nov. 28, 1916.
2 SHEETS—SHEET 1.

Witnesses

Inventor
J. Kessler,
By Victor J. Evans
Attorney

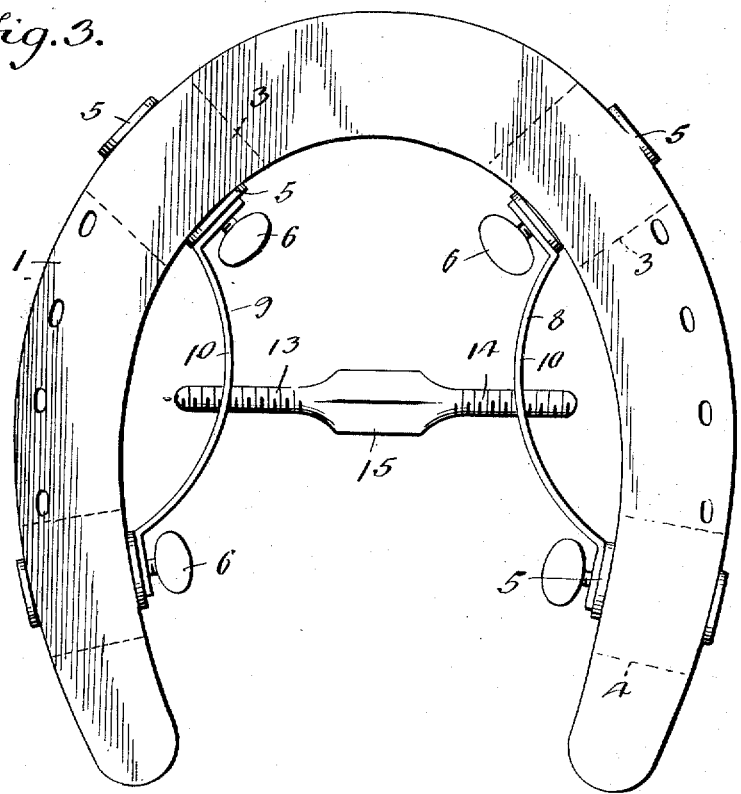
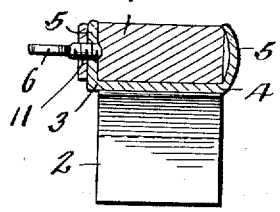
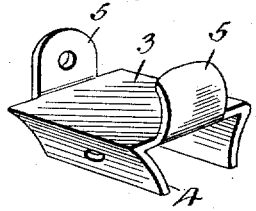

UNITED STATES PATENT OFFICE.

JUSTUS KESSLER, OF HACKENSACK, NEW JERSEY.

HORSESHOE-CALK.

1,206,332.  Specification of Letters Patent.  Patented Nov. 28, 1916.

Application filed May 31, 1916. Serial No. 100,834.

*To all whom it may concern:*

Be it known that I, JUSTUS KESSLER, a citizen of the United States, residing at Hackensack, in the county of Bergen and State of New Jersey, have invented new and useful Improvements in Horseshoe-Calks, of which the following is a specification.

This invention relates to an improved calk and means for holding a series of these calks on a horseshoe so that they can be easily attached or detached from the said horseshoe.

With the above and other objects in view the improvement resides in the construction, combination and arrangement of parts set forth in the following specification and falling within the scope of the appended claim.

Figure 1:
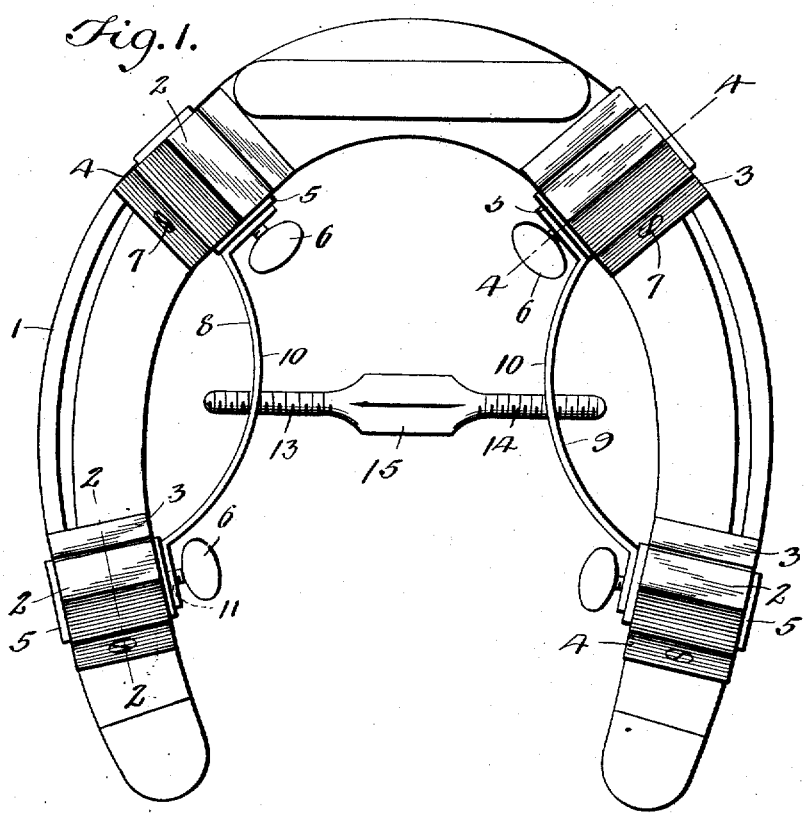
Figure 2:
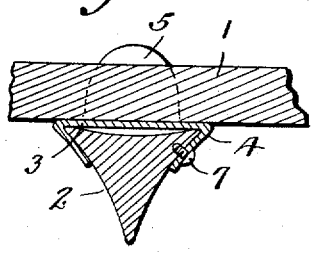
Figure 5:
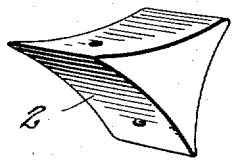

In the drawings, Figure 1 is a bottom view of a horseshoe illustrating the application of my improvement, Fig. 2 is a sectional view approximately on the line 2—2 of Fig. 1, Fig. 3 is a perspective view looking toward the top of the shoe, Fig. 4 is a sectional view approximately on the line 4—4 of Fig. 1, Fig. 5 is a perspective view of one of the calks, and Fig. 6 is a perspective view of the calk-holding means.

In the drawings, the numeral 1 designates a horseshoe of the ordinary construction upon which is arranged calks constructed in accordance with the present invention.

The calks, indicated by the numerals 2, are preferably wedge-shaped in end elevation and are adapted to be received in the wedge-shaped body members 3 of holder members 4. The bodies of the holders adjacent their opposite edges are provided with outwardly extending fingers 5, adapted to contact with the opposite edges of the horseshoe, and one or both of said fingers may be provided with threaded openings for the reception of binding screws 6. The calks 2 are sustained in the holders preferably through the medium of removable elements such as screws 7, whereby the calks when worn may be readily replaced. As illustrated in the drawings the calks are arranged adjacent the heel and toe portions of the shoe 1, and to properly sustain the calks securely upon the shoe I provide springs 8 and 9, each of which has its central portion arched, as at 10, and its ends straight and provided with openings 11. These openings may be elongated and may receive suitable securing elements which are attached to the members 3, or the said openings may receive the referred-to screws 6. The springs 8 and 9 are bowed inwardly with respect to the shoe 1 and are centrally provided with threaded orifices which aline and which are adapted to receive the right- and left-hand threads 13 and 14 respectively provided upon shank members which extend centrally in opposite directions from a turning head 15. It will be apparent that when the head 15 is turned the bowed central portions of the springs 8 and 9 will be compressed toward the opposite and inner sides of the shoe or brought away from the said inner sides in accordance with the direction in which the member 15 is turned, and by this construction it will be noted that the calks may be easily and quickly applied to the shoe and permanently applied thereon. The peculiar construction of the calks whereby the same are substantially triangular in end view, permits of all of the sharpened or pointed edges thereof being employed so, as a matter of fact, a single calk presents three distinct wearing surfaces, and the advantages of such a construction will, it is thought, be readily apparent.

From the above description, taken in connection with the accompanying drawings, the simplicity of the device as well as the advantages thereof will, it is thought, be perfectly apparent to those skilled in the art to which such invention appertains without further detailed description.

Having thus described the invention, what I claim is:

The combination with a shoe, of calks for the shoe, a holder member for each of the calks comprising spaced ears which are adapted to engage with the opposite edges of the shoe, sustaining means for the calks, said sustaining means comprising two oppositely disposed inwardly bowed springs having their ends connected with the calk holding means, and a longitudinally adjustable member associated with the springs for forcing the same toward the inner edges of the shoe or to bring the said springs away from the said edges of the shoe, substantially as described.

In testimony whereof I affix my signature in presence of two witnesses.

JUSTUS KESSLER.

Witnesses:
GEORGE HOHN,
JUSTUS DE WITT.

Copies of this patent may be obtained for five cents each, by addressing the "Commissioner of Patents. Washington, D C."